United States Patent [19]

Wilburn et al.

[11] 4,081,095
[45] Mar. 28, 1978

[54] VEHICLE TOP ARTICLE CARRIER

[76] Inventors: Everett R. Wilburn, 1847 Princeton Dr., Toledo, Ohio 43614; James C. Sorter, 6125 Windamar Rd., Toledo, Ohio 43611

[21] Appl. No.: 781,210

[22] Filed: Mar. 25, 1977

[51] Int. Cl.² ............................................. B60R 9/04
[52] U.S. Cl. ................ 214/450; 224/42.1 H; 214/83.24; 308/3.8
[58] Field of Search ............ 224/42.1 H, 42.1 E, 224/42.1 F, 42.1 D, 42.1 G, 42.1 R, 42.45 R, 42.44, 42.43, 42.41, 42.05, 29 R; 296/22; 214/450, 83.24; 312/341; 308/3.6, 3.8, 6 R

[56] References Cited

U.S. PATENT DOCUMENTS

| | | | |
|---|---|---|---|
| 3,113,819 | 12/1963 | Bessette | 224/42.1 E X |
| 3,193,124 | 7/1965 | Essling | 214/450 |
| 3,726,422 | 4/1973 | Zelin | 214/83.24 |
| 3,809,425 | 5/1974 | Blaschke | 224/42.1 E X |
| 3,963,136 | 6/1976 | Spanke | 214/450 |

FOREIGN PATENT DOCUMENTS

| | | | |
|---|---|---|---|
| 773,122 | 4/1957 | United Kingdom | 308/3.8 |

*Primary Examiner*—Trygve M. Blix
*Assistant Examiner*—Jerold M. Forsberg
*Attorney, Agent, or Firm*—Donald R. Fraser

[57] ABSTRACT

An article carrier for a vehicle top capable of being loaded in a lowered position adjacent the side of the vehicle while one end portion of the carrier is typically supported against the ground and the other end is pivotally and slidable mounted in a position of the assembly mounted on the vehicle top. The loaded portion of the carrier is then disposed on the top of the vehicle by tilting the inclined loaded portion to slide to the desired position in the position mounted on the vehicle top. The carrier assembly is unloaded by reversing the foregoing steps.

3 Claims, 4 Drawing Figures

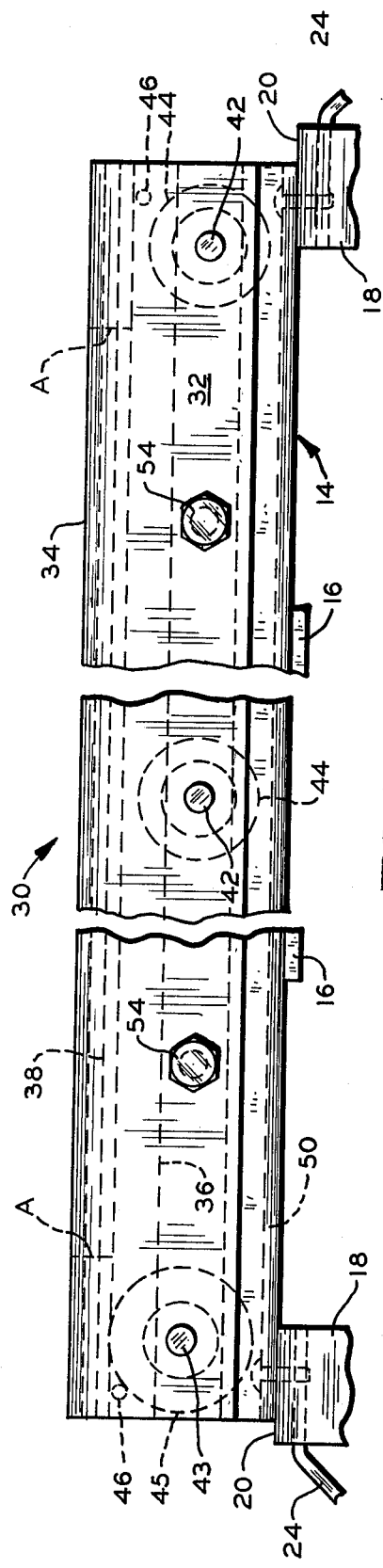
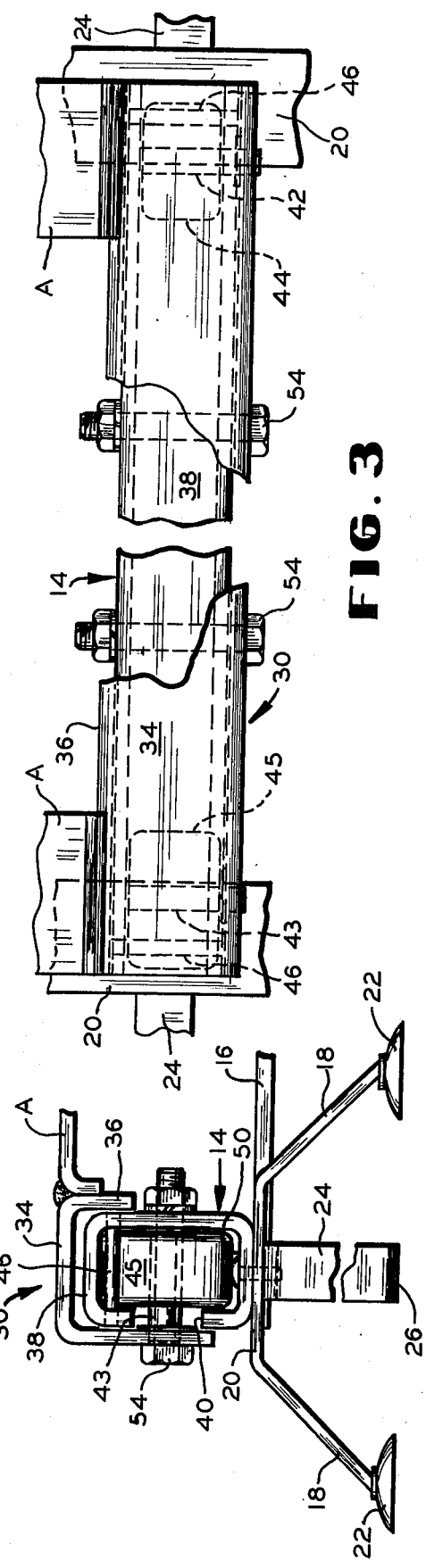

VEHICLE TOP ARTICLE CARRIER

BACKGROUND OF THE INVENTION

1. Field of the Invention

The present invention relates to vehicle top article carriers comprising a stationary frame structure rigidly secured to the top of a vehicle and a relatively movable loading and unloading article supporting rail structure (wherein which the loading and unloading rail) may be readily moved to an inclined loading position with one end resting upon the ground and the other end pivotally interconnected to the stationary frame structure. The loaded supporting rail structure may be then readily moved to a transit position with the stationary frame on the vehicle top.

2. Description of the Prior Art

As is well known in the art, the market place is replete with car top luggage and ski racks, and with many kinds of carriers which are able to carry small boats and other similar cargo.

Many of these carriers have a stable frame which is typically mounted on the top of the vehicle and at least two rails which move from a position atop the frame to a position at an end of the frame where the rails are pivoted to an inclined position so as to engage the ground. In this inclined position the rails are loaded and repositioned to the top of the frame. See for example, the U.S. Pat. Nos. 2,506,421 and 2,551,357 issued to F. H. Hacker et al and E. C. Swenson, respectively.

Some of these devices employ rollers to facilitate the travel of the rails relative to the frame. The patent to R. J. Essling for example, U.S. Pat. No. 3,193,124 shows a device which employs rollers in this manner.

A number of problems have become evident in these devices. One of the major problems is that many times there is no reliable mechanism to prevent the rails from totally disengaging from the frame while the loading operation is in progress. This causes many of these devices to be unsafe for the person loading the cargo and to raise a risk of possible cargo damage.

Also many of the prior devices were difficult to use inasmuch as the rails would not easily move from their position on top of the frame to the inclined position. This caused a significant problem in the routine use of any of these devices.

Therefore, an object of the present invention is to design an article carrier which is of simple, sturdy design onto which a boat, camping equipment or the like may be easily loaded and unloaded with great safety from any accidental disengagement of the rails during the loading operation.

Another object is to design a simple reliable system to facilitate the movement of the rails along the frame of the article carrier which will remain easy to operate for long periods of time.

A further object is to design an article carrier of a very simple practical design composed of few parts that can be readily manufactured and assembled.

A further object is to design an article carrier in which all moving parts are securely locked together during transit.

The above, as well as other objects and advantages of the present invention, may be achieved by an article carrier for a vehicle top having a pair of spaced apart channel members adapted to span the substantial width of a vehicle top with means to securee the channel members to the vehicle top; article supporting rails; arrays of rollers connected to each of the rails and adapted to be received within respective ones of the channel members to thereby provide for relative movement therebetween, each of the arrays including one roller of a larger diameter than the other rollers of the array; and detent means extending inwardly of each of the channel members to militate against the passage of the large supporting rail members having a larger diameter than the other rollers in the array, which are received by diameter roller of the array while permitting the passage of the other rollers of the arrays.

BRIEF DESCRIPTION OF THE DRAWINGS

The above objects and advantages will become readily apparent to one skilled in the art from reading the following detailed description of an embodiment of the present invention when considered in the light of the accompanying drawings, in which:

FIG. 2 is an elevational view of the invention illustrated in FIG. 1 showing the article carrier portion positioned on the top of the vehicle;

FIG. 3 shows a top plan view of the structure illustrated in FIG. 2; and

FIG. 4 is an end view of the structure illustrated in FIGS. 1, 2 and 3 as viewed from the left hand side of FIG. 2.

DESCRIPTION OF THE PREFERRED EMBODIMENT

Figure 1:
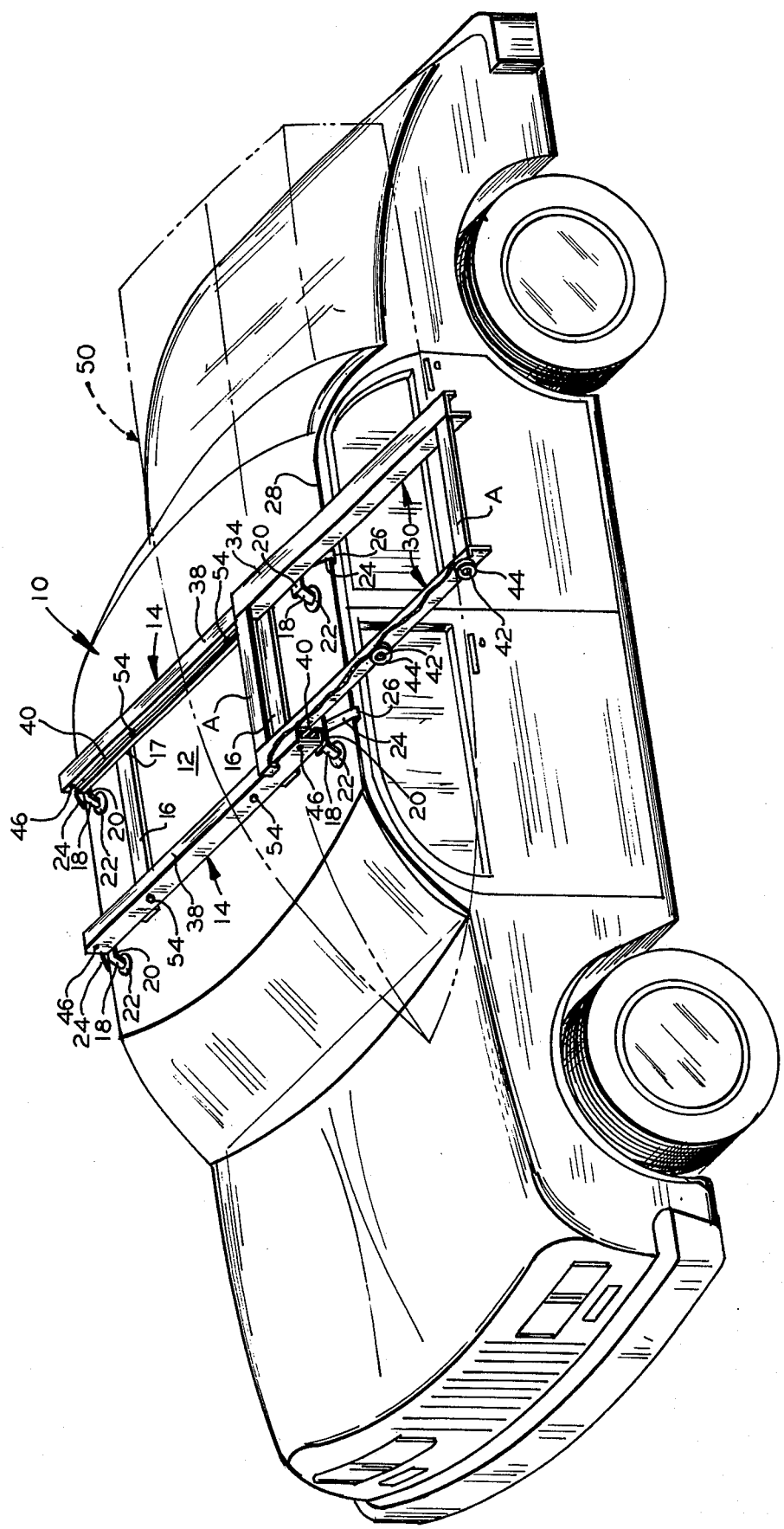
FIG. 1 is a perspective view of a vehicle with an article carrier according to the present invention secured to the top thereof, and showing a typical placement of a large article of cargo.

As shown in the drawings, the present invention is embodied in an article carrier generally indicated by the reference numeral 10 secured to a vehicle top 12. The article carrier 10 has a pair of channel members 14 of generally C-shaped cross-section. The channel members 14 may be maintained in a substantially parallel relation by a suitably disposed set of cross bars 16. The cross bars 16 are typically secured to the channel members 14 by welding or threaded fasteners 17.

Adjacent each of the ends of each of the channel members 14 are attached support legs 18. The support legs 18 are secured to the respective channel members 14 by a plate 20 which is secured to one end of each of the legs 18. The other end of each of the legs 18 is secured to a suction cup 22 which engages the top 12 of the vehicle to aid in maintaining the carrier 10 in its proper position. A hold down strap 24, which terminates in a clasp 26, engages the drip rail 28, or inner edge of the window frame of the associated vehicle to hold the article carrier 10 to the top 12 with the aid of the suction cups 22.

FIGS. 2, 3 and 4 show, in detail, article supporting rail members 30 designed to cooperate with the channel members 14. Each of the rail members 30 includes a vertically extending side portion 32, a parallel spaced apart depending portion 36 of somewhat less dimension than the side portion 32, and an interconnecting web 34. When the rail members 30 are in transit position, the webs 34 are superimposed in spaced relation over respective ones of the channel members 14, and the side portions 32 are adjacent the open sides of the channel members 14 as will be described in greater detail hereinafter.

In the illustrated embodiment of the invention, there are three roller members affixed in spaced relation along the inner surface of the side portion 32 of each of the supporting rail members 30. Typically, these rollers are spaced equidistantly along the side portion 32 of the rail 30; however, for a particular application, the number and size of rollers may be altered. The rollers 44 are mounted for rotation on suitable shafts 42 which, in turn, are fixedly mounted at spaced intervals along the side portion 32 of the rail member 30. The illustrated embodiment of the invention shows the use of an end roller 45 which is of slightly larger diameter than the rollers 44 and mounted on a suitable supporting shaft 43 at the left end of the rail member 30.

It will be appreciated from the drawings that the stationary channel members 14 are C-shaped in cross-section thereby defining an elongate interior channel having a coextending slot portion 40 along one side thereof, a top wall 38, and a bottom wall 50. The rollers 44 and 45 of the rail members 30 are adapted to roll along the length of the interior channel of the members 14 with their respective shafts 42 and 43 extending through and traversing the slot 40 during the loading and unloading operations of the assembly. The larger diameter roller 45 of each roller array has its shaft 43 mounted slightly above the center line of the smaller roller shafts 42. This allows all of the rollers in the same plane along the bottom 50 of the channel member 14.

In order to assure that the roller 45 cannot unintentionally be removed from the interior of the channel member 14, a pair of detents 46 is employed, one detent 46 at opposite ends of the channel 14. The detent 46 may typically be in the form of a roll pin or the like which is adapted to extent transversely across the upper portion of the interior of the channel member 14 and positioned by suitably aligned apertures, for example at such a height to block the passage of the larger roller 45 and allow the passage of the other roller 44 thereunder. Accordingly, when it is desired to load the carrier 10, the rail members 30 are moved from a horizontal position parallel with the channel members 14 to a second position at one end of the channel members 14 by sliding the rail members 30 to the left in FIG. 2. As the large diameter roller 45 approaches the end of the channel member 14, the detent member 46 blocks its path so as to stop the travel of the rail 30 at the end of the channel member 14. The detent member 46, as explained hereinbefore, is positioned at such a height at the end of the channel member 14 as to block only the path of the larger diameter roller 45 and to allow the smaller rollers 44 to pass thereunder. This method of maintaining the last roller 45 within the channel member 14 provides a safe, simple method of assuring that the rail members 30 are in a stable position during the loading operation without causing the operator to employ separate rail locking items.

Once the rail 30 has reached the end of the channel member 14 and its travel has been stopped by the detent 46, the rail members 30 are pivoted about the larger rollers 45 from the horizontal position to an inclined position. In this inclined position, the ends of the rail members 30 having the larger roller 45 are maintained in the channel member 14 while the other end is swung downwardly until contacting the ground.

After a load, for example the boat 52 shown in FIG. 1, is secured by suitable means to the rail members 30 in their inclined position, the rail members 30 are swung upwardly to a position in a plane parallel to plane of the channel members 14, and then pushed inwardly until the larger diameter roller 45 contacts the rear detent 46 at the far right of the channel member 14, as clearly illustrated in FIGS. 2 and 3. Upon completion of the loading operation, threaded fasteners 54 are inserted through suitable apertures in the sides of the channel members 14 and the side portion 32 of the rail members 30. The apertures adapted to receive the threaded fasteners 54 are brought into alignment by simply slightly raising or elevating the rail members 30 with respect to the associated respective channel member 14. These fasteners 54 serve to maintain the rollers 44 and 45 slightly off the bottom 50 of the channel member 14 to remove the downward pressure of the load and also to securely lock the rail members 30 and the respective channel members 14 to prohibit relative motion therebetween thereby minimizing frictional wear and load shifting. This increases the safety in transit of the cargo and lessens wear on the rollers 44 and 45 to extend their useful life and provide for generally smooth operation of the device.

Accordingly, when the structure of the invention is in its loaded position, movement of the rollers 44 and 45 is stopped by the positioning of the threaded fasteners 54. When the fasteners 54 are removed, the rail members 30 are free to move relative to the channel members 14 to the one end thereof, and pivot about the large roller 45, which is maintained in the channel member 14 by the detent 46.

In order to facilitate the alignment of the rail members 30 during the loading and unloading operations, cross brace members A may be utilized. The ends of the cross braces A typically have their opposite end portions secured as by welding, for example to end portions of individual rail members 30 as is clearly illustrated in FIG. 1.

While in the illustrated embodiment of the invention the channel members 14 are disposed so that the slot portions 40 are in facing relation, it will be understood that members 14 could be arranged such that the slot portions 40 faced rearwardly. In such instance, the disposition of the cooperating rail members 30 would be arranged accordingly.

While a preferred embodiment in accordance with the present invention has been illustrated and described, it is understood that various modifications may be resorted to without departing from the scope of the appended claims.

What is claimed is:
1. A vehicle top article carrier comprising:
a pair of spaced apart channel members adapted to span the substantial width of the verticle top, said channel members having a generally C-shaped cross-section;
means to suitably secure said channel members to the vehicle top;
article supporting rails having flanges depending therefrom;
an array of rollers connected to each of the flanges of said rails and adapted to be received within respective ones of said channel members to thereby provide for relative movement therebetween, each of said arrays including one roller of a larger diameter than the other rollers of said array;
detent means extending inwardly of each of said channel members to militate against the passage of the larger diameter roller of said array while permitting the passage of the other rollers of said ar- ray, registrable apertures in said channel members and said article supporting rails which are registrable by raising the article supporting rails, restraining means extending through said apertures when registered for removing the weight from the rollers and restraining motion of the article supporting rails relative to the channel members during transit.

2. The invention defined in claim 1 wherein said article supporting rails are of a generally L-shaped cross-section.

3. The invention defined in claim 1 wherein said detent means is a generally cylindrical roll pin extending across the end of said channel member and positioned at the top of said channel members.

* * * * *